United States Patent
Matula

(10) Patent No.: US 8,495,106 B2
(45) Date of Patent: Jul. 23, 2013

(54) WRITE INSTRUCTION DATASOURCE FOR DATABASE WRITE PROCEDURE

(75) Inventor: Charles Matula, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/299,711

(22) Filed: Nov. 18, 2011

(65) Prior Publication Data

US 2013/0132446 A1    May 23, 2013

(51) Int. Cl.
   *G06F 17/30*   (2006.01)
(52) U.S. Cl.
   USPC .......................................... 707/812
(58) Field of Classification Search
   USPC .......................... 707/812, 704, 600
   See application file for complete search history.

(56) References Cited

U.S. PATENT DOCUMENTS

| | | | |
|---|---|---|---|
| 6,862,593 B2 * | 3/2005 | Walters ................................. | 1/1 |
| 6,920,458 B1 * | 7/2005 | Chu et al. ....................... | 707/600 |
| 7,689,572 B2 * | 3/2010 | Chu et al. ................... | 707/999.1 |
| 7,908,257 B2 * | 3/2011 | Mittal et al. .................. | 707/704 |
| 2007/0179973 A1 * | 8/2007 | Brodie et al. .............. | 707/104.1 |
| 2009/0094229 A1 | 4/2009 | Ferrel et al. | |

\* cited by examiner

*Primary Examiner* — Sheree Brown

(74) *Attorney, Agent, or Firm* — Weitzman Law Offices, LLC

(57) ABSTRACT

A computer implemented system and method for enabling a database write operation for an application that only has a database read operation is disclosed. At least one data source is stored in a database, the data source having at least one pre-coded stored write operation. A database read operation that calls the data source is received. The read operation is performed on the database, the read operation causing the database to execute the pre-coded stored write operation on the database.

8 Claims, 6 Drawing Sheets

WRITE INSTRUCTION DATASOURCE FOR DATABASE WRITE PROCEDURE

BACKGROUND

1. Field

This disclosure relates generally to databases, and, more particularly, to database write operations.

2. Background

Projects often call for the use of specific applications operating in conjunction with one or more database services. Some applications are designed only to read information from the database, in accordance with their original design purpose, and thereby lack the ability to execute write operations on the database. In some cases, the parameters of the project call for the use of these read-only applications, but would also benefit greatly if the read-only application could somehow execute one or more write operations on the database. Replacing the application or modifying it to allow for execution of write operations may be expensive, time-consuming or otherwise generally undesirable, especially if only a simple write operation is desired.

BRIEF SUMMARY

In one aspect of this disclosure, a system and method for enabling a database write operation for a read-only application is disclosed. At least one data source is stored in a database, the data source having at least one pre-coded stored write operation. A database read operation that calls the data source is received. The read operation is performed on the database, the read operation causing the database to execute the pre-coded stored write operation on the database.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a system and method of enabling a database "write" operation for an application that is only capable of executing a "read" operation (hereinafter, a "read-only" application). Databases usually have a set of basic instructions for reading and altering information stored on the database. Read operations, such as a "select" function, instruct the database to retrieve and return certain stored data to the requesting user. Select functions may target specific data using logical statements such as "from" or "where," which define or otherwise limit the returned set of data according to arguments specified in the logical statements. Write operations, such as "insert," "update," and "delete," retrieve and alter certain database contents based on, again, logical statements that define the set of targeted data and the specific alterations to be made. These read and write operations are typically part of the core functionality of the database, and called externally by applications interoperating with the database. Sometimes, the external applications are designed as read-only applications, and do not have the functionality to call the database write operations. Projects that call for the use of the read-only application may benefit from the implementation of a write operation for use by the read-only application. The absence of a write operation may therefore present a significant impediment to the completion of the project.

Figure 1:
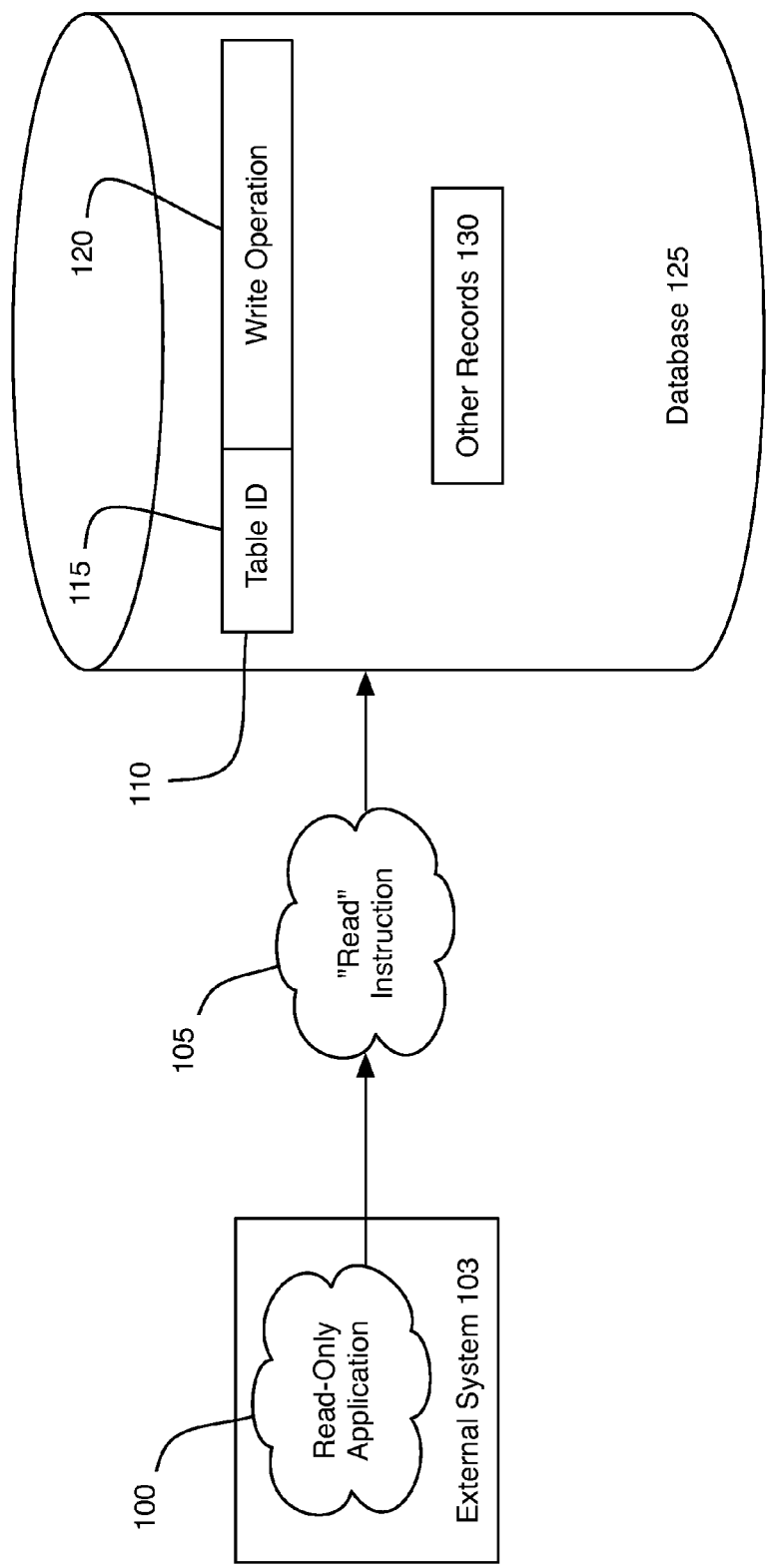
FIG. 1 is a high level representation of the system and method for enabling a database write operation for a read-only application.

In one aspect of this disclosure, a system and method is disclosed for enabling a read-only application to execute a database write operation. FIG. 1 is a high level representation of a read-only application utilizing a write instruction datasource 110 to execute a database write operation. An application lacking a write operation 100 is running on an external system 103. Because the read-only application 100 lacks a write function, it cannot perform standard write functions directly on the database 125. To circumvent this limitation, write operations may be stored on the database in special entries referred to herein as "write operation datasources" 110. When a write operation is desired, the read-only application 100 may perform a read operation calling for the write operation datasource 110. The write operation 120 stored in the datasource 110 may be executed by the database 125 during execution of the read operation. This exploit therefore allows a read-only application 100 to indirectly execute a write operation on other records 130 stored in the database 125. Each write operation datasource 110 may be associated with one or more write operations 120. For example, in a relational database system, each write operation datasource 110 may be stored as an independent table containing a single data entry for the write instruction 120. Alternatively, multiple write operations may be associated with a single write operation datasource 110, and the desired write operation determined by use of a special argument (as will be discussed further below).

Figure 2A:
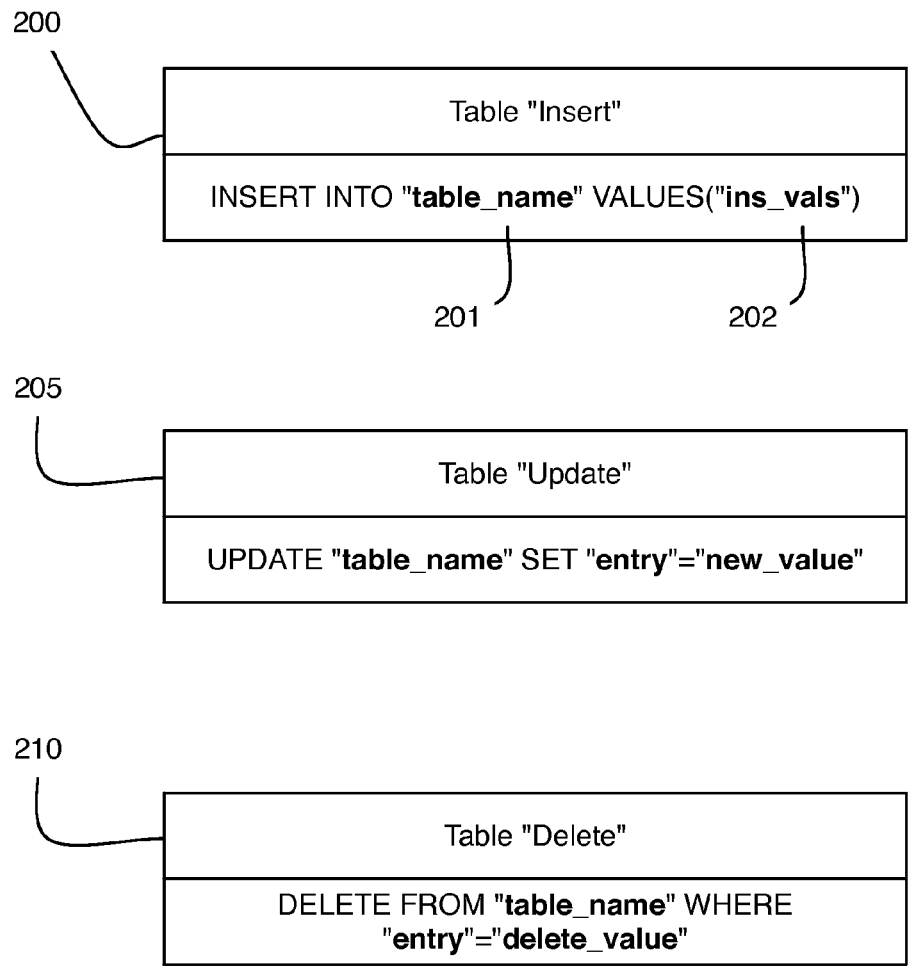
FIG. 2A is a high level representation of three write instruction datasources.

FIG. 2A is a high level representation of three such write operation datasources 200, 205 and 210. As with standard database tables, each write operation datasource may have a table name, such as "insert" 200, "update" 205, and "delete" 210. It is understood the names selected herein are used only for clarity. In one embodiment, each table may contain a single entry, comprising the stored write instruction. For example, on a Structured Query Language (hereinafter, "SQL") database, the write operation datasource 200 "insert" may contain a SQL write instruction executing an insert operation on the database. The write operations may be prepared to receive arguments. For example, the insert operation may be designed to receive arguments, such as the "table_name" argument 201 and "ins_val" argument 202 (corresponding to the name of the table the value is to be inserted in, and the value to be inserted, respectively). These arguments may be passed to the write instruction from the read operation sent from the read-only application.

Figure 2B:
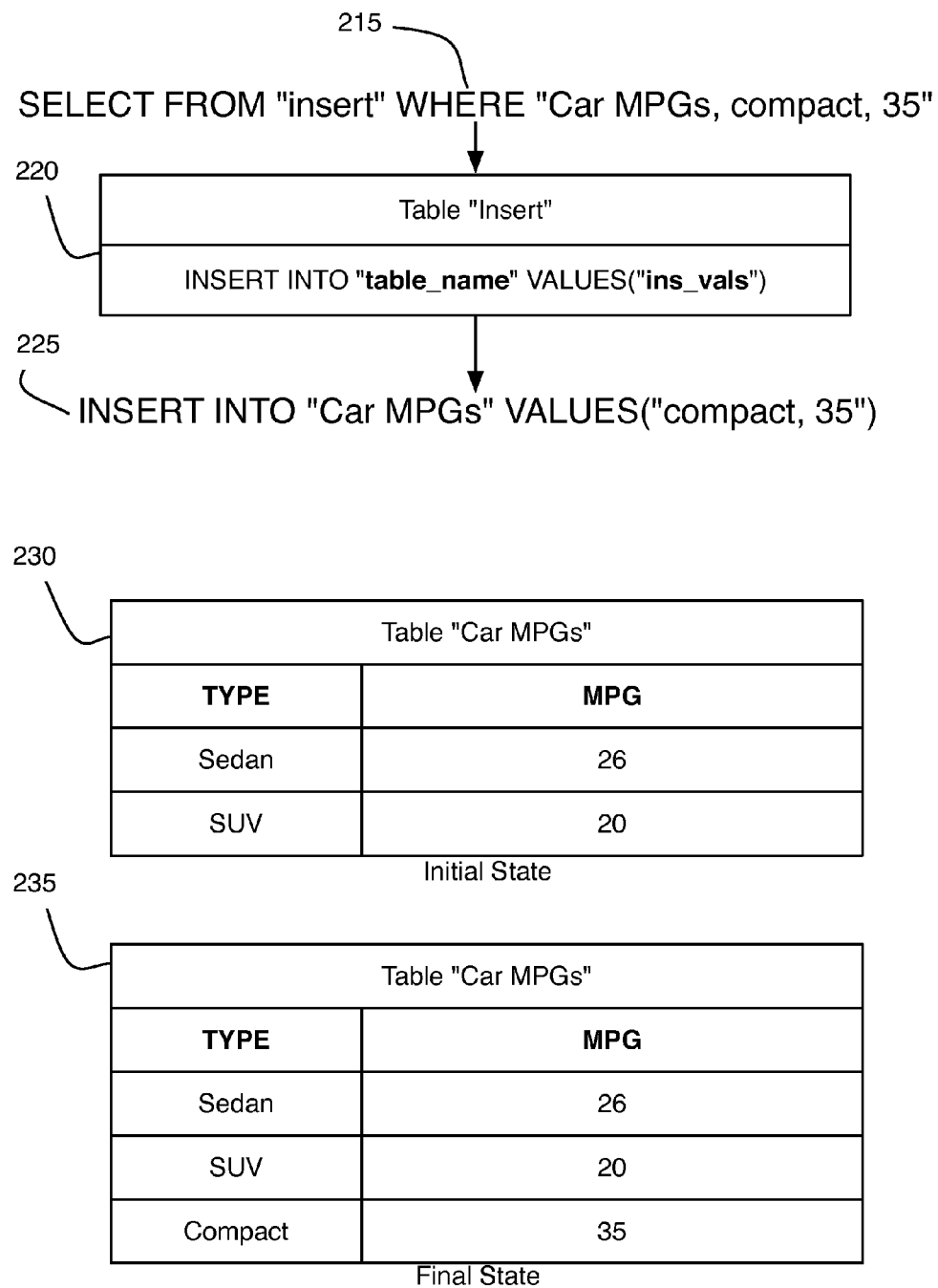
FIG. 2B is a high level representation of the process by which a read instruction interacts with a datasource to effect a write operation on a database record.

FIG. 2B is a high level representation of the execution of an example write operation by a read-only application on a database, illustrating the process described above. The read-only application may send a read operation 215 to the database for execution. The exemplary SQL read operation 215 asks the database to retrieve records from the table "insert" and masks arguments to be passed to the write operation as arguments in the SQL "where" clause. The database receives the read operation and selects the "insert" table 220 as requested, and passes the arguments from the read operation to the appropriate locations. For example, the first value may automatically be passed to the "table_name" argument, while subsequent values may be passed to the "ins_vals" argument. This may generate the populated write instruction 225, which is then executed by the database in the course of executing the initial read operation. The results may then be seen in the initial state 230 and final state 235 of the table "Car MPGs." The execution of the populated write instruction 225 causes a new entry to be inserted into the table, having a first value of "compact" and a second value of "35," as desired. The write operation datasource therefore allows the execution of write operations by read-only applications.

Figure 3:
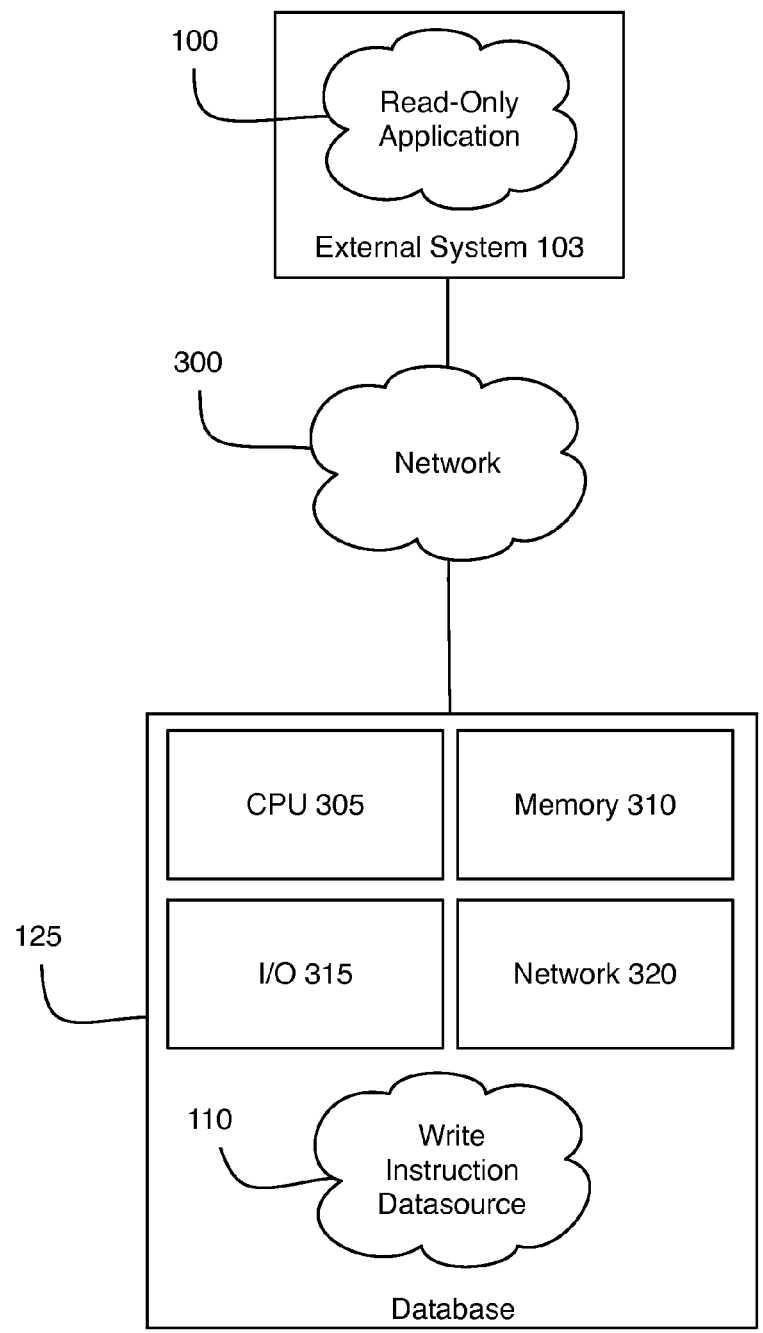
FIG. 3 is a high level representation of the system for enabling a database write operation for a read-only application.

FIG. 3 is a high level representation of an illustrative database system 125 on which a write instruction datasource 110 may be implemented and utilized. The read-only application 100 may be operating on a separate computer system 103 and be operatively coupled to the database system 125 through a network 300. As discussed above, the write instruction datasource 110 may be implemented utilizing one or more computing systems of varying configurations. For instance, the computing systems may be combined as a single computing system. Each computing system preferably includes computing components for executing computer program instructions and processes. These components may include a central processing unit (CPU) 305, memory 310, input/output (I/O) devices 315, and a network interface 320.

The CPU 305 processes and executes computer program instructions. Random access memory (RAM) 310 and/or fast access cache memory preferably provides fast data supply to CPU 305. Long-term storage may be provided as a more permanent form of computer memory, and may be, for example, a hard disk, optical disk, flash memory, solid-state memory, tape, or any other type of memory. The I/O device(s) 315 permit human interaction with the computer system, such as (but not limited to) a mouse, keyboard and computer display. I/O device(s) 315 may also include other interactive devices, such as (but not limited to) touch screens, digital stylus, voice input/output, etc. The network interface device 300 may provide the database 125 with access to a network (such as network 300), which may be a wireless or wired connection. The network 300 may be, for example, the Internet, a corporate intranet, or any other computer network through which the computing system may connect to or otherwise communicate with other computerized systems or databases for specialized information that may be necessary for implementation of the database 125 and/or write instruction datasource 110.

Figure 4:
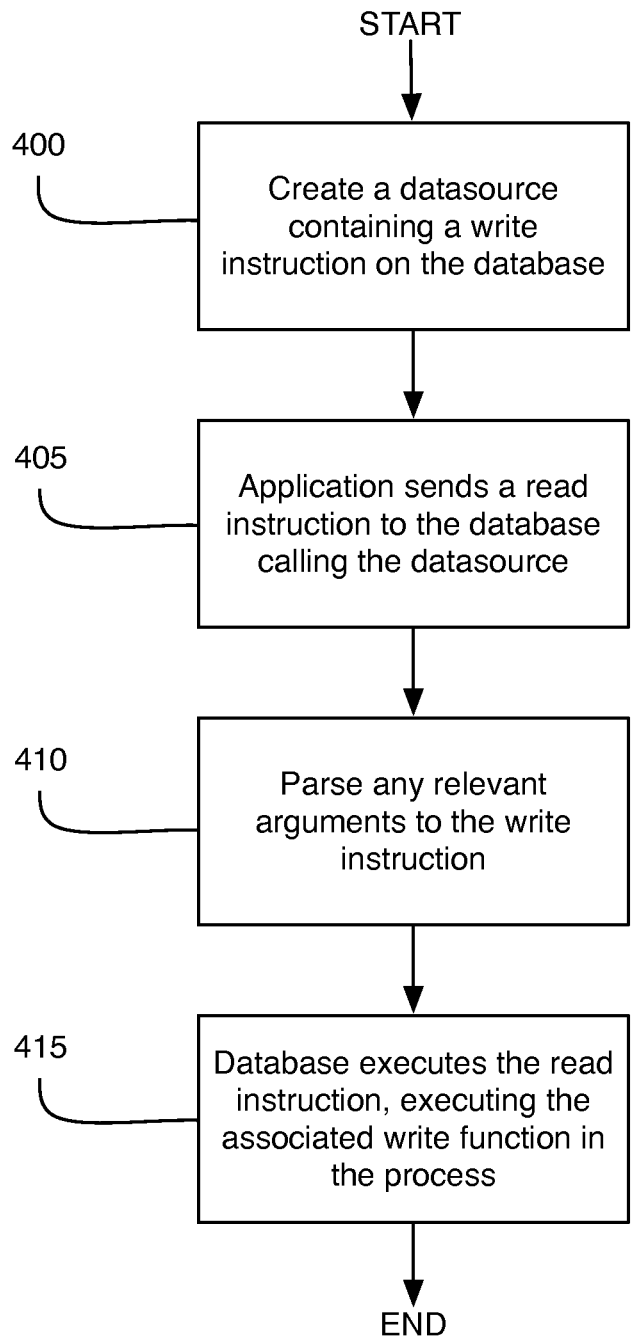
FIG. 4 is an exemplary sequence of steps for implementing the illustrative write instruction datasource.

FIG. 4 is a sequence of steps for implementing the illustrative write instruction datasource, where each datasource contains a single write instruction. When a write instruction is desired for implementation, a write instruction datasource may be created on the database and populated with at least one write instruction (step 400). The read-only application may then request execution of the write instruction by sending a read instruction to the database querying for the datasource (step 405). Any arguments to be passed to the write instruction are parsed from the read instruction, and populate the stored write instruction (step 410). Execution of the read instruction causes the associated (and populated) write instruction to be executed as well (step 415).

Figure 5:
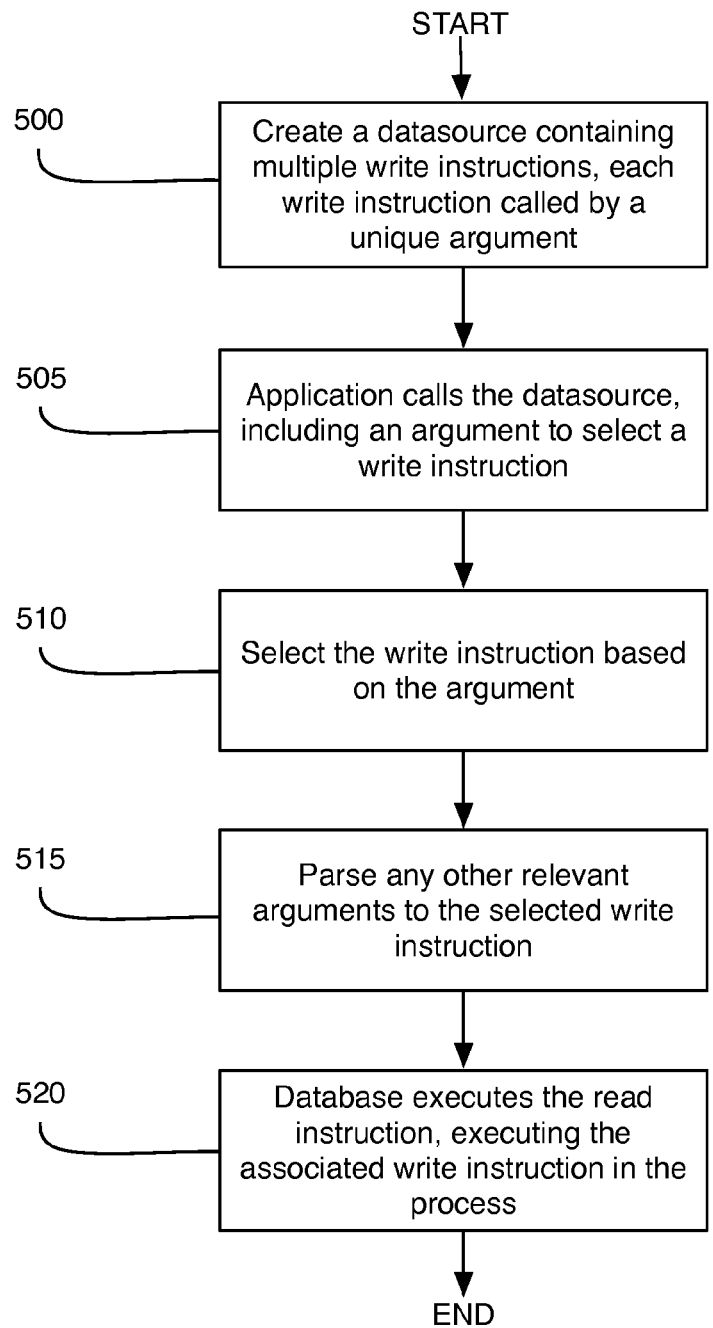
FIG. 5 is an exemplary sequence of steps for implementing another embodiment of the illustrative write instruction datasource.

Alternative organizational formats may be implemented. For example, a single datasource may alternatively contain a single "read" target record that is associated with a number of "write" instructions, and require the input of an argument to dictate which "write" instruction is to be selected for execution by the database. FIG. 5 is a continuing sequence of steps for implementing the illustrative write instruction datasource, in the embodiment wherein each datasource is associated with a multiple "write" instructions. A write instruction datasource may be created in the database, the datasource containing a plurality of write instructions (step 500). Each write instruction may be called by a unique argument. A read-only application may send a read instruction to the database, calling for the datasource and populated with at least an argument necessary to select one of the write instructions (in addition to any arguments that may be used to populate the desired write instruction) (step 505). Subsequently, the appropriate argument is read from the read instruction to determine which of the write instructions associated with the target is to be executed (step 510). Any additional arguments may be parsed and used to populate the selected write instruction, if appropriate (step 515). Finally, the database may execute the read instruction, executing the populated associated write instruction in the process (step 520).

Software process or processes and executables may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer implemented system for enabling a database write operation to be performed at the request of an application that only has the ability to request a database read operation, comprising:
   a computer processor;
   a database;
   at least one write operation data source stored in the database such that it is accessible to the application that only has the ability to request a database read operation as part of a read request by the application, the write operation data source having at least one pre-coded stored write operation therein which, when accessed by the application pursuant to the read request including at least one argument, will receive the at least one argument;
   memory comprising program instructions, the program instructions executable by the computer processor to:
      receive a database read operation from the application calling for reading the write operation data source, and
      cause the database to parse the at least one argument received from the database read operation by the write operation data source for use in performing a write operation on the database, based upon executing the pre-coded stored write operation.

2. The system of claim 1, wherein the program instructions are further executable to:
   populate the pre-coded stored write operation with the at least one argument when the read operation is performed.

3. The system of claim 1, wherein each write operation data source includes exactly one pre-coded stored write operation.

4. The system of claim 1, wherein each write operation data source includes a plurality of pre-coded stored write operations.

5. The system of claim 4, wherein the program instructions are further executable to:
   select one of the plurality of pre-coded stored write operations for execution based on the at least one argument.

6. A computer implemented method enabling an application that only has database read operation capability to perform a write operation in a database, comprising:
   storing a data source in a database, the data source being accessible to the application that only has database read operation capability via a read request including at least one argument, the data source having at least one pre-coded stored write operation stored therein which, when executed, will parse the at least one argument and write to the database based upon the at least one argument;
   receiving a database read operation from the application that only has database read operation capability calling the data source; and
   performing, using a processor, the read operation on the database by accessing the data source such that, the read operation will cause the database to use the at least one argument and execute the pre-coded stored write operation on the database to effect a write to the database.

7. The method of claim 6, wherein the method further comprises:
   populating the pre-coded stored write operation with the at least one argument when the read operation is performed.

8. The method of claim 6, wherein the data source includes at least two pre-coded stored write operations, the method further comprising:
   retrieving, as part of the database read operation, a selective argument;
   based upon the selective argument, identifying one of the at least two pre-coded stored write operations as a desired pre-coded stored write operation; and
   performing the read operation on the database, by executing the desired pre-coded stored write operation.

* * * * *